(12) United States Patent
Danielson

(10) Patent No.: US 10,333,906 B2
(45) Date of Patent: *Jun. 25, 2019

(54) NETWORK COMMUNICATION DECODER USING KEY PATTERN ENCRYPTION

(71) Applicant: BANK OF AMERICA CORPORATION, Charlotte, NC (US)

(72) Inventor: Christopher L. Danielson, Poway, CA (US)

(73) Assignee: Bank of America Corporation, Charlotte, NC (US)

( * ) Notice: Subject to any disclaimer, the term of this patent is extended or adjusted under 35 U.S.C. 154(b) by 162 days.

This patent is subject to a terminal disclaimer.

(21) Appl. No.: 15/474,334

(22) Filed: Mar. 30, 2017

(65) Prior Publication Data

US 2018/0287784 A1 Oct. 4, 2018

(51) Int. Cl.
*H04K 1/02* (2006.01)
*H04L 9/00* (2006.01)
*H04L 29/06* (2006.01)
*H04L 9/06* (2006.01)

(52) U.S. Cl.
CPC ........ *H04L 63/0428* (2013.01); *H04L 9/0631* (2013.01)

(58) Field of Classification Search
CPC . H04L 9/0819; H04L 9/0894; H04L 63/0428; H04L 9/14
USPC .................................. 380/252, 261, 43, 277
See application file for complete search history.

(56) References Cited

U.S. PATENT DOCUMENTS

| | | |
|---|---|---|
| 5,185,796 A | 2/1993 | Wilson |
| 7,023,998 B2 | 4/2006 | Garay et al. |
| 7,415,618 B2 | 8/2008 | de Jong |
| 7,681,234 B2 | 3/2010 | Florencio et al. |
| 7,870,609 B2 | 1/2011 | Hulten et al. |
| 8,413,238 B1 | 4/2013 | Sutton |
| 8,533,821 B2 | 9/2013 | Crume |
| 8,649,552 B2 | 2/2014 | Balakrishnan et al. |
| 8,707,431 B2 | 4/2014 | Stephens et al. |
| 8,737,618 B2 | 5/2014 | Etemad et al. |
| 8,756,684 B2 | 6/2014 | Frantz et al. |
| 8,934,633 B2 | 1/2015 | Tomaru |
| 8,973,140 B2 | 3/2015 | Shnowske et al. |
| 9,213,859 B2 | 12/2015 | Strassmann et al. |

(Continued)

OTHER PUBLICATIONS

Danielson, C. L., "Network Communication Encoder Using Key Pattern Encryption," U.S. Appl. No. 15/474,070, filed Mar. 30, 2017, 29 pages.

*Primary Examiner* — Aravind K Moorthy
(74) *Attorney, Agent, or Firm* — Michael A. Springs

(57) ABSTRACT

A decoding device that includes a decoding engine implemented by a processor connected to a memory. The decoding engine is configured to receive an encoded signal. The encoding engine is further configured to determine an encoded signal byte value at an encoded signal byte location in the encoded signal. The encoded signal byte location is mapped to a key map byte location in a key map. The decoding engine is further configured to determine a key map byte value at the key map byte location in the key map. The decoding engine is further configured to set a decoded signal byte value with the encoded signal byte value at the decoded signal byte location in a decoded signal. The decoding engine is further configured to output the decoded signal.

20 Claims, 5 Drawing Sheets

(56) References Cited

U.S. PATENT DOCUMENTS

| | | | |
|---|---|---|---|
| 9,313,028 B2 | 4/2016 | Tamayo-Rios | |
| 9,483,656 B2 | 11/2016 | Leggette et al. | |
| 9,495,240 B2 | 11/2016 | Grube et al. | |
| 2008/0040603 A1* | 2/2008 | Stedron | H04L 9/088 |
| | | | 713/166 |
| 2010/0214069 A1* | 8/2010 | Kong | G05B 23/0229 |
| | | | 340/10.1 |
| 2015/0347751 A1 | 12/2015 | Card et al. | |
| 2016/0197935 A1 | 7/2016 | Jamison et al. | |
| 2016/0203086 A1* | 7/2016 | Ng | G06F 21/00 |
| | | | 713/193 |
| 2016/0330219 A1 | 11/2016 | Hasan | |
| 2017/0195117 A1* | 7/2017 | Wu | G09C 1/00 |
| 2017/0288855 A1* | 10/2017 | Kumar | H04L 9/003 |
| 2017/0346809 A1* | 11/2017 | Plotnik | H04L 63/0815 |
| 2017/0366339 A1* | 12/2017 | Noura | G09C 1/00 |
| 2017/0366514 A1* | 12/2017 | Malka | H04L 63/0428 |
| 2018/0069694 A1* | 3/2018 | Riou | G06F 21/14 |
| 2018/0139188 A1* | 5/2018 | Iyer | H04L 63/0435 |
| 2018/0167196 A1* | 6/2018 | Cooper | G06F 21/72 |
| 2018/0287783 A1* | 10/2018 | Danielson | H04L 9/0819 |

* cited by examiner

NETWORK COMMUNICATION DECODER USING KEY PATTERN ENCRYPTION

TECHNICAL FIELD

The present disclosure relates generally to cryptography, and more specifically to a communication system using cryptography.

BACKGROUND

Securely transferring data and information across a network poses several technical challenges. Networks are susceptible to attacks by bad actors trying to gain access to private or sensitive information. These bad actors may attempt to eavesdrop on or intercept data that is being communicated across the network. Conventional systems may use an encryption algorithm to encrypt data before transmitting the data across the network in an effort to protect the data content.

These encryption algorithms provide some level of protection, however bad actors may still attempt to use a brute force approach to decrypt the data. In the past, using brute force to find an encryption key was not feasible because computing resources were limited and attempting all possible key combinations would require a significant amount of time. As the processing power and speed of computers increases, so does their ability to more rapidly find encryption keys. This means that the complexity of conventional encryption algorithms may one day become trivial as computers continue to get faster and more powerful.

SUMMARY

Securely transferring data and information across a network poses several technical challenges due to the increasing speed and power of modern and future computing devices. In the past, using brute force to find an encryption key was not feasible because computing resources were limited and attempting all possible key combinations would require a significant amount of time. However, as computers continue to get faster and more powerful, the complexity of conventional encryption algorithms may one day become trivial. As the processing power and speed of computers increases, it becomes a technical challenge to maintain the ability to securely send data across a network.

Key pattern derivation or encryption uses an unconventional technique that disguises a data signal with a noise signal. Key pattern encryption provides a technical solution to the increasing speed of computers by providing an technique with a factorial-based increase in complexity over conventional encryption algorithms. Key pattern encryption provides several technical advantages such as increasing the complexity and the amount of time require to find an encryption key using brute force by orders of magnitude. The increased complexity over conventional encryption algorithms provides increased data security regardless of the current speed of computing devices employed by bad actors. Key pattern encryption may be used on its own or in conjunction with a conventional encryption algorithm to provide increased complexity.

In one embodiment, an encoding device uses a key map to interweave a data signal within a noise signal. The key map is a data structure that improved the operation of a device by providing the ability to make a resulting encoded signal appear like a noise signal to other devices in the network. This provides an additional technical advantage by making the original data more difficult to find. The encoded signal cannot be identified or decoded without the key map that was used to encode the signal. A decoding device uses a copy of the key map to decode an encoded signal in order to recover the original data signal from the encoded signal.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
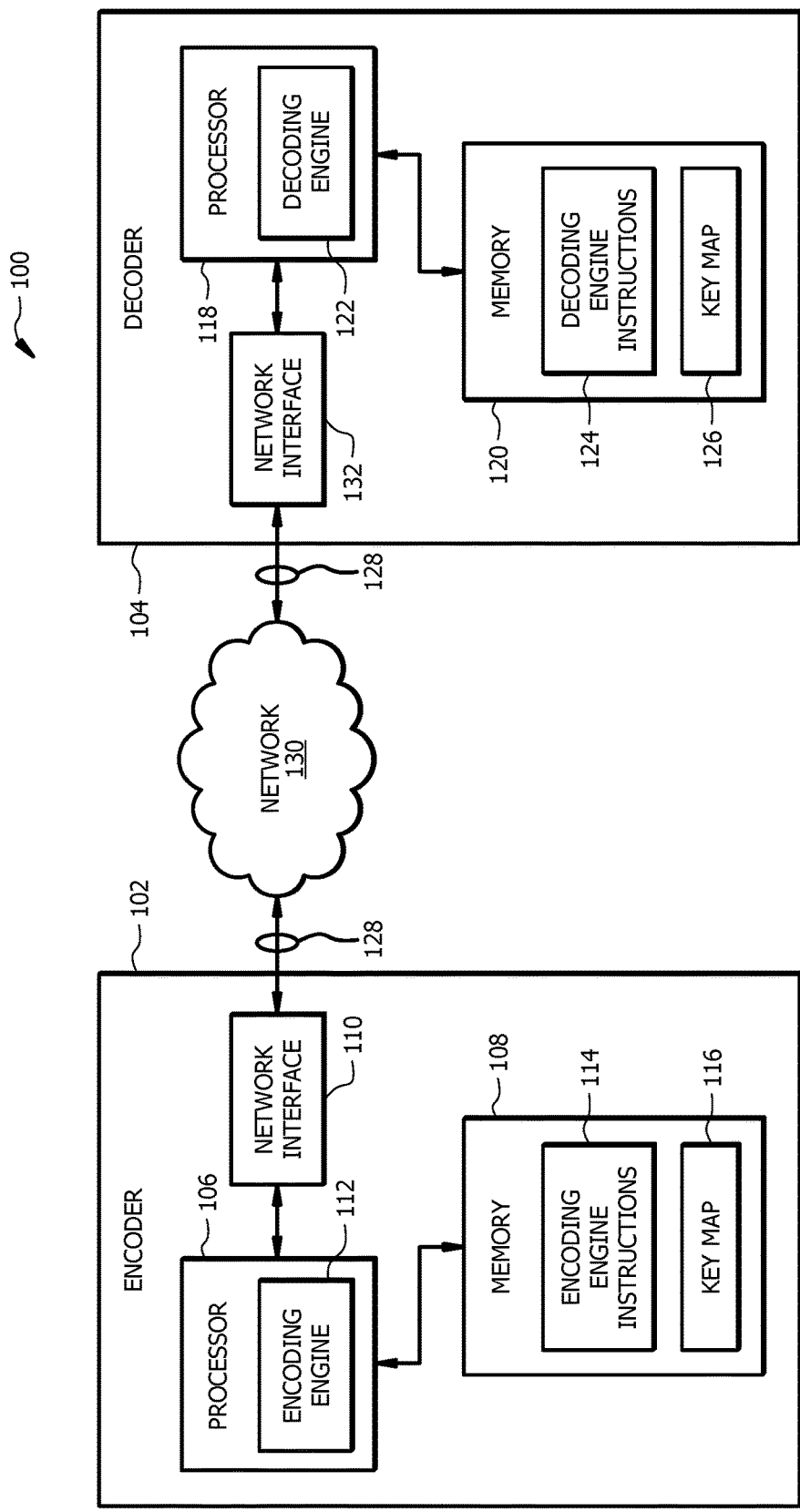
FIG. 1 is a schematic diagram of an embodiment of a communication system configured to employ key pattern encryption.

FIG. 1 is a schematic diagram of an embodiment of a communication system 100 configured to employ key pattern encryption. The communication system 100 comprises an encoder device 102 in signal communication with a decoder device 104 via a network 130. The encoding device 102 and the decoding device 104 may be members of the same network or members of different networks. The encoder device 102 is configured to employ any suitable type of connection to communicate data with the decoder device 104. Examples of encoder devices 102 and decoder devices 104 include, but are not limited to, mobile phones, computers, tablet computers, laptop computers, clients, and servers. The communication system 100 is generally configured such that the encoder device 102 encodes information or data using key pattern encryption and sends the encoded signal 128 to the decoder device 104. FIG. 1 shows an example of the communication system 100 with a single encoder device 102 and a single decoder device 104. In other examples, the communication system 100 may comprise any suitable number of encoder devices 102 and/or decoder devices 104.

The network 130 comprises a plurality of network nodes configured to communicate data between the encoder device 102 and the decoder device 104. Examples of network nodes include, but are not limited to, routers, switches, modems, web clients, and web servers. Network 130 is any suitable type of wireless and/or wired network including, but not limited to, all or a portion of the Internet, the public switched telephone network, a cellular network, a card network, and a satellite network. The network 130 is configured to support any suitable communication protocols as would be appreciated by one of ordinary skill in the art upon viewing this disclosure.

In one embodiment, the encoder device 102 comprises a processor 106, a memory 108, and a network interface 110.

The encoder device 102 may be configured as shown or in any other suitable configuration. The processor 106 comprises one or more processors operably coupled to the memory 108. The one or more processors are implemented as one or more central processing unit (CPU) chips, logic units, cores (e.g. a multi-core processor), field-programmable gate array (FPGAs), application specific integrated circuits (ASICs), or digital signal processors (DSPs). The one or more processors are communicatively coupled to and in signal communication with the memory 108. The one or more processors are configured to process data and may be implemented in hardware or software.

The one or more processors are configured to implement various instructions. For example, the one or more processors are configured to execute instructions to implement an encoding engine 112. In an embodiment, the encoding engine 112 is implemented using logic units, FPGAs, ASICs, DSPs, or any other suitable hardware. The encoding engine 112 is generally configured encode data using key pattern encryption and to send an encoded information 128 to a decoder device 104. The encoding engine 112 may also be configured to encrypt the data prior to encoding the data. The encoding engine 112 may be configured to employ any suitable encryption technique. An example of the encoding engine 112 in operation is described in FIG. 2.

The memory 108 comprises one or more disks, tape drives, or solid-state drives, and may be used as an over-flow data storage device, to store programs when such programs are selected for execution, and to store instructions and data that are read during program execution. The memory 108 may be volatile or non-volatile and may comprise read-only memory (ROM), random-access memory (RAM), ternary content-addressable memory (TCAM), dynamic random-access memory (DRAM), and static random-access memory (SRAM). The memory 108 is operable to store encoding engine instructions 114, a key map 116, and/or any other data or instructions. The encoding engine instructions 114 comprise any suitable set of instructions, logic, rules, or code operable to execute the encoding engine 112.

The key map 116 may also be referred to as a noise overlay. The key map 116 is a data structure configured to provide a mapping that integrates a data signal with a noise signal to create an encoded signal 128. In one embodiment, the key map 116 is the same length (e.g. number of bytes) as the noise signal. The key map 116 provides a mapping that interweaves or embeds portions of a data signal within a random noise signal. The generated encoded signal 128 appears as a noise signal to other devices in the network. In some embodiments, the encoded signal 128 may be camouflaged to look like another type of data file or may be embedded within a data file. The encoded signal cannot be decoded without the key map that was used to encode the signal.

Figure 3:
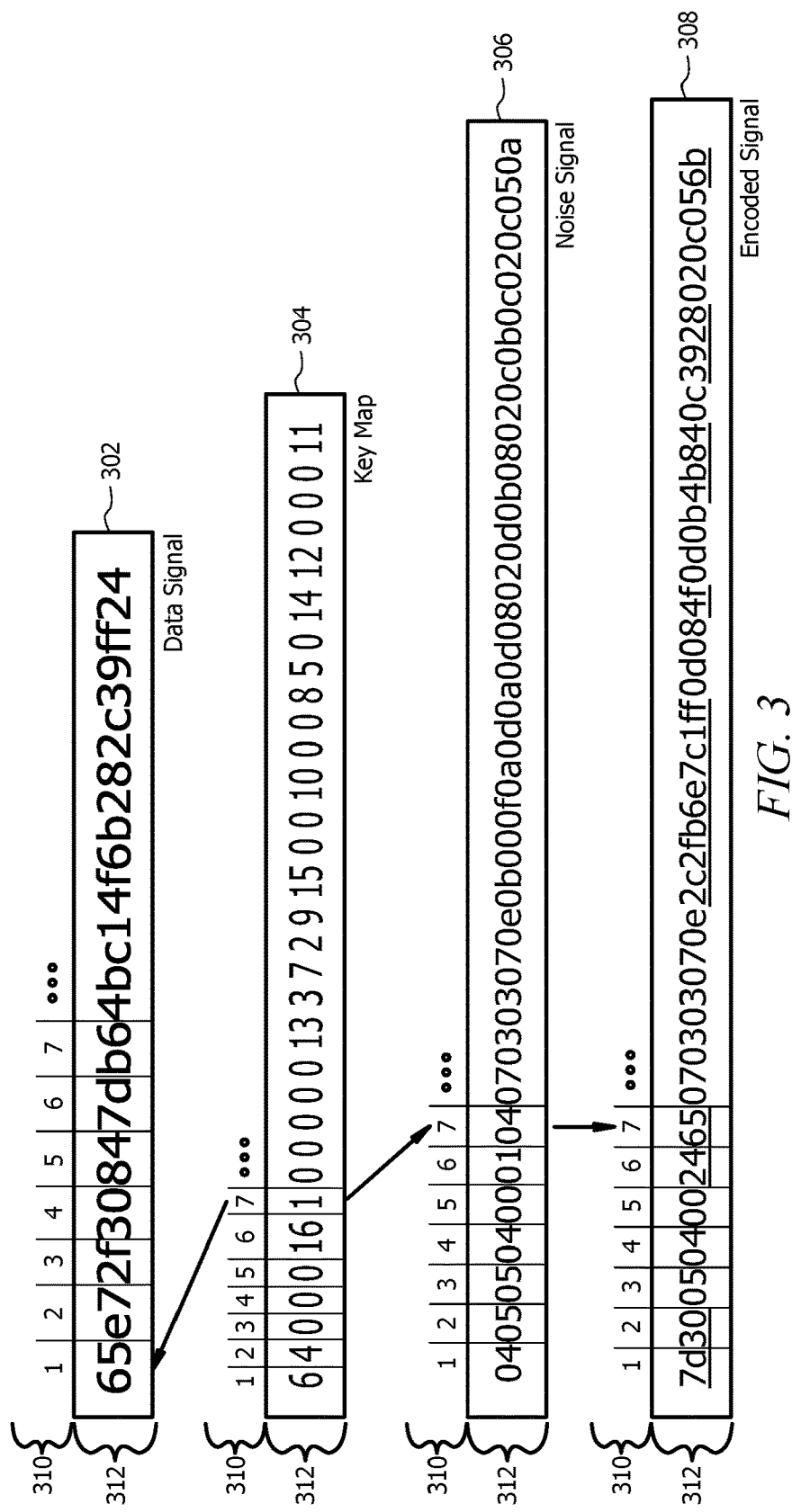
FIG. 3 is a schematic diagram of an embodiment of the encoding method in operation.
Figure 5:
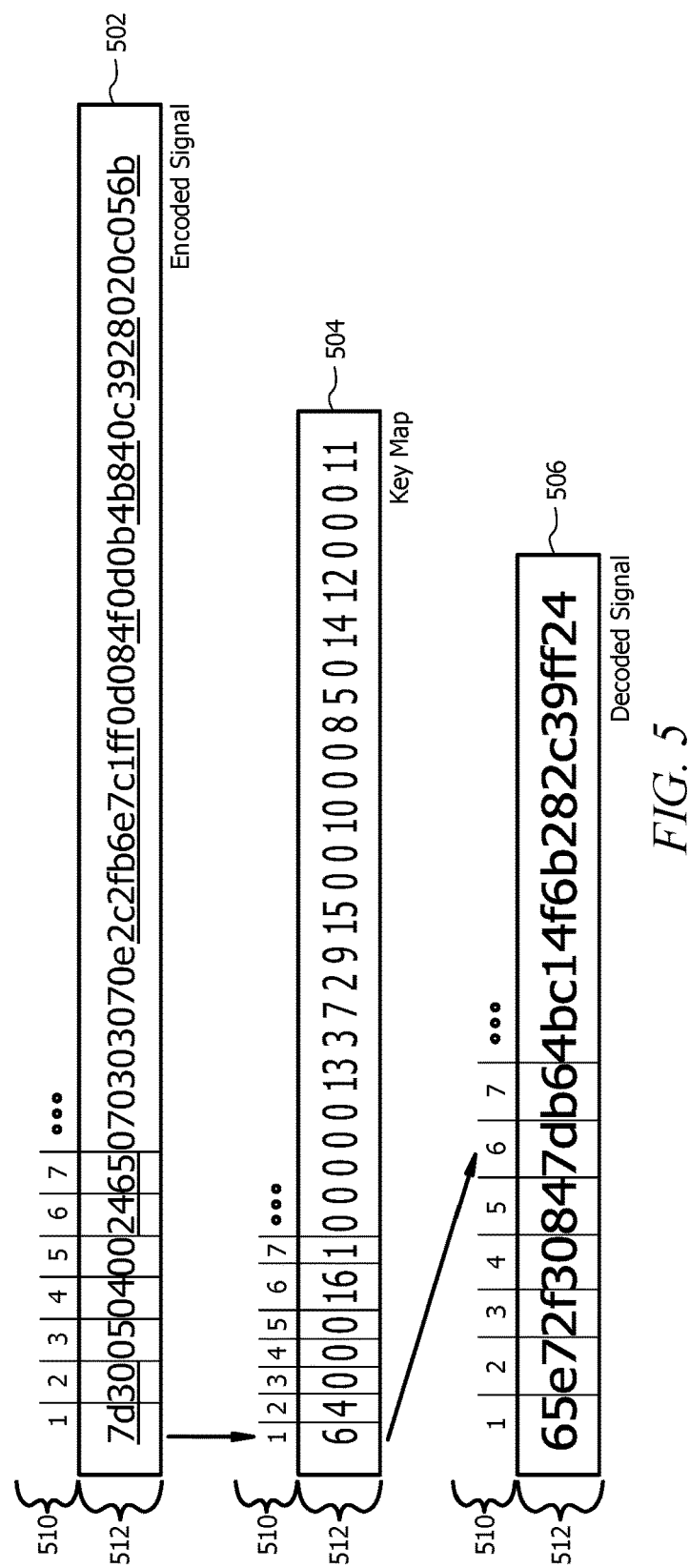
FIG. 5 is a schematic diagram of an embodiment of the decoding method in operation.

Examples of the key map 116 are described in FIGS. 3 and 5. In one embodiment, each byte of the key map 116 is mapped to a byte of a noise signal. For example, the first byte of the key map 116 may correspond with the first byte of the noise signal, the second byte of the key map 116 may correspond with the second byte of the noise signal, and so on.

The value of each byte in the key map 116 identifies a byte location in a data signal. For example, a key map byte value of six may correspond with the sixth byte of a data signal. In one embodiment, the key map byte value is an offset value. The value at each byte in the key map 116 is a value from among a random combination of zeros and unique values. There may be one or more zeros in the key map 116, but non-zero values are not repeated within the key map 116. A key map byte value of zero may indicate to not map a portion of the data signal to a particular byte location in the noise signal. In other examples, any other suitable key map byte value or character may be used to indicate to not map a portion of the data signal to a particular byte location in the noise signal.

In one embodiment, the encoder device 102 is configured to generate the key map 116. For example, the encoding engine 114 may be configured to generate a key map template, that is initialized with a value of zero in every byte. The encoding engine 114 may be further configured to randomly assign portions of the data signal to different locations in the key map template to generate the key map 116. For instance, the encoding engine 114 may set a byte value in the key map template to a value that corresponds with a byte location in the data signal.

The network interface 110 is configured to enable wired and/or wireless communications. The network interface 110 is configured to communicate data through the network 130 and/or any other system or domain. For example, the network interface 110 may be configured for communication with a modem, a switch, a router, a bridge, a server, or a client. The processor 106 is configured to send and receive data using the network interface 110 from the network 130.

In one embodiment, the decoder device 104 comprises a processor 118, a memory 120, and a network interface 132. The decoder device 104 may be configured as shown or in any other suitable configuration. The processor 118 comprises one or more processors operably coupled to the memory 120. The one or more processors are implemented as one or more CPU chips, logic units, cores (e.g. a multi-core processor), FPGAs, ASICs, or DSPs. The one or more processors are communicatively coupled to and in signal communication with the memory 120. The one or more processors are configured to process data and may be implemented in hardware or software.

The one or more processors are configured to implement various instructions. For example, the one or more processors are configured to execute instructions to implement a decoding engine 122. In an embodiment, the decoding engine 122 is implemented using logic units, FPGAs, ASICs, DSPs, or any other suitable hardware. The decoding engine 122 is generally configured decode an encoded signal 128 using key pattern encryption and to output the decoded information. The decoding engine 122 may also be configured to decrypt the decoded signal when the original data signal was encrypted. The decoding engine 122 may be configured to employ any suitable decrypting technique. An example of the decoding engine 122 in operation is described in FIG. 4.

The memory 120 comprises one or more disks, tape drives, or solid-state drives, and may be used as an over-flow data storage device, to store programs when such programs are selected for execution, and to store instructions and data that are read during program execution. The memory 120 may be volatile or non-volatile and may comprise ROM, RAM, TCAM, DRAM, and SRAM. The memory 120 is operable to store decoding engine instructions 124, a key map 126, and/or any other data or instructions. The decoding engine instructions 124 comprise any suitable set of instructions, logic, rules, or code operable to execute the decoding engine 122.

The key map 126 is configured similar the key map 116 in the encoder device 102. In one embodiment, the key map 126 is identical to the key map 116. In one embodiment, each byte of the key map 126 is mapped to a byte of an encoded signal 128. For example, the first byte of the key map 126 may correspond with the first byte of the encoded signal 128, the second byte of the key map 126 may correspond with the second byte of the encoded signal 128, and so on.

The value of each byte of the key map 126 identifies a byte location for a decoded signal. For example, a key map byte value of six may correspond with the sixth byte of the decoded signal. In one embodiment, the key map byte value is an offset value. The value at each byte in the key map 126 is a value from among a random combination of zeros and unique values. There may be one or more zeros in the key map 126, but non-zero values are not repeated within the key map 126. A key map byte value of zero may indicate to ignore or discard the byte value at that particular byte location in the encoded signal. In other examples, any other suitable key map byte value or character may be used to indicate to ignore or discard the byte value at that particular byte location in the encoded signal.

The network interface 132 is configured similar to the network interface 110 in the encoder device 102. The network interface 132 is configured to enable wired and/or wireless communications. The network interface 132 is configured to communicate data through the network 130 and/or any other system or domain. The processor 118 is configured to send and receive data using the network interface 132 from the network 130.

Figure 2:
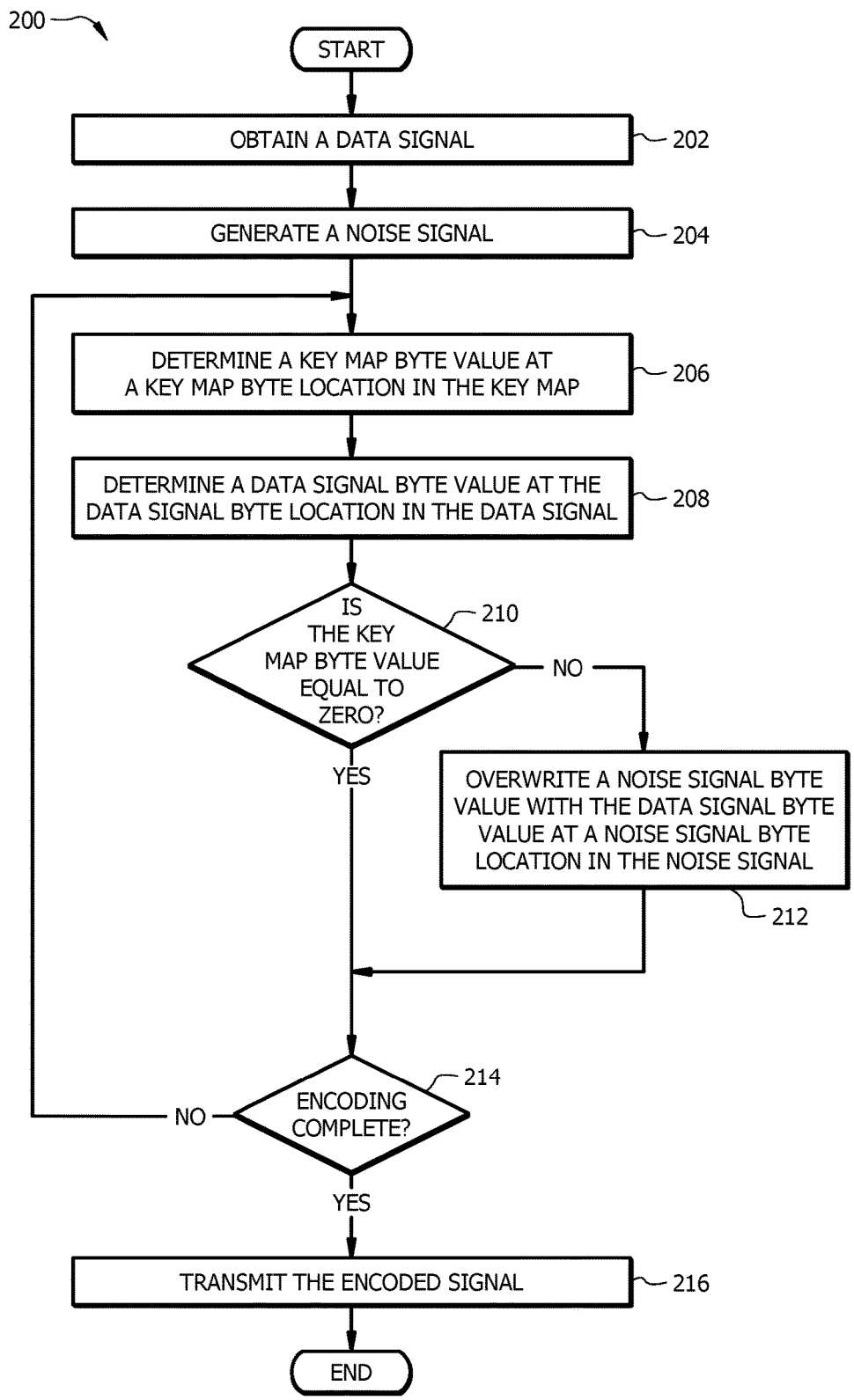
FIG. 2 is a flowchart of an embodiment of an encoding method for the communication system.

FIG. 2 is a flowchart of an embodiment of an encoding method 200 for the communication system 100. Method 200 is implemented by an encoding engine 112 to encode a data signal before communicating the data signal across a network. A non-limiting example is provided to illustrate how the encoding engine 112 implements method 200 to encode and transmit a data signal. In this example, a user has sensitive data they would like to communicate across a network to another user. The user employs a device with an encoding engine 112 (e.g. an encoder device 102) to first encode the data using key pattern encryption and then transmit the encoded data. The encoded data appears like a noise signal to other devices within the network that do not have a copy of the key map that was used to generate the encoded data.

At step 202, the encoding engine 112 obtains a data signal. The data signal may be provided by a user or may be obtained from memory (e.g. memory 108). Examples of data signals include, but are not limited to, electronic documents, text files, images, video files, music files, and any other suitable type of document.

In one embodiment, the encoding engine 112 encrypts the data signal. For example, the encoding engine 112 may encrypt the data signal using an Advanced Encryption Standard (AES) algorithm with a 256 bit key. In other examples, the encoding engine 112 may encrypt the data signal using any other suitable encryption technique. Encrypting the data signal increases the complexity of the encoded signal, which increases the amount of time required to determine the original data signal using brute force. This additional complexity provides additional security for the data be transmitted across the network. An example of the complexity involved in decoding a data signal that is encrypted and encoded using brute force is shown in Table 1.

At step 204, the encoding engine 112 generates a noise signal. The noise signal may be a random or pseudorandom signal. In one example, the encoding engine 112 may employ a random number generator to generate the noise signal. In another example, the encoding engine 112 may employ a random noise generator that generates a white noise signal, a pink noise signal, or any other suitable type of noise signal. In another example, the encoding engine 112 may use an image and steganography to generate the noise signal. In other examples, the encoding engine 112 may employ any other suitable technique for generating the noise signal as would be appreciated by one of ordinary skill in the art. In one embodiment, the noise signal is at least as long at the data signal. For example, the noise signal may be the same length as the data signal. In one embodiment, the encoding engine 112 uses a noise multiplier to increase the complexity of the noise signal. Increasing the size and/or complexity of the noise signal makes the process of decoding an encoded signal using brute force harder.

At step 206, the encoding engine 112 determines a key map byte value at a key map byte location in the key map. The key map byte value indicates a corresponding data signal byte location in the data signal. For example, a key map byte value of three would indicate the third byte location in the data signal. At step 208, the encoding engine 112 determines a data signal byte value at the data signal byte location in the data signal.

An example of performing steps 206 and 208 is shown in FIG. 3. Referring to FIG. 3, a data signal 302, a key map 304, a noise signal 306, and an encoded signal 308 are shown. In FIG. 3, the first seven byte locations 310 of each signal are labeled to indicate their corresponding byte values 312. For example, in the data signal 302, the first byte location has a byte value of 0x65, the second byte location has a byte value of 0xe7, the third byte location has a byte value of 0x2f, and so on. In this example, the byte values are represented in hexadecimal. In other examples, the byte values may be represented using any other system (e.g. ASCII, binary, or decimal).

In FIG. 3, the seventh iteration in the encoding process is shown using arrows. In this example, the seventh key byte location in the key map 304 is the current key map byte location. The key map byte value in the seventh key byte location is equal to 0x01, which corresponds with the first byte location in the data signal 302. The data signal byte value in the first byte location of the data signal 302 is equal to 0x65.

Returning to FIG. 2, at step 210, the encoding engine 112 determines whether the key map byte value is equal to zero. The encoding engine 112 proceeds to step 214 when the encoding engine 112 determines that the key map byte value is equal to zero. When the key map byte value is equal to zero the encoding engine 112 does not modify the current byte location in the noise signal. An example of modifying the noise signal is described in step 212. The encoding engine 112 proceeds to step 212 when the encoding engine 112 determines that the key map byte value is not equal to zero.

As an example, in FIG. 3, the key map byte value in the seventh byte location of the key map 304 is 0x01, which is not equal to zero (i.e. 0x00). In this example, the encoding engine 112 would then proceed to step 212. If the key map byte value had been 0x00, then the encoding engine 112 would proceed to step 214.

At step 212, the encoding engine 112 overwrites a noise signal byte value with the data signal byte value at a noise signal byte location in the noise signal. The noise signal byte location corresponds with the current key map byte location. In other words, the noise signal is modified by overwriting a portion of the noise signal with a portion of the data signal. The resulting signal that is generated by modifying the noise signal is the encoded signal.

Referring again to FIG. 3, the current key map byte location is the seventh key byte location in the key map 304, which corresponds with the seventh noise signal byte location in the noise signal 306. In this iteration, the encoding engine 112 overwrites the current noise signal byte value (i.e. 0x04) in the seventh noise signal byte location with the current data signal byte value (i.e. 0x65). The resulting change is shown in the seventh byte location of the encoded signal 308.

Returning to FIG. 2, at step 214, the encoding engine 112 determines whether the encoding process is complete. For example, the encoding engine 112 may determine whether any data is left in the data signal to encrypt. The encoding engine 112 returns to step 206 for additional encoding iterations when the encoding process has not been completed. Otherwise, the encoding engine 112 proceeds to step 216 when the encoding process is complete. At step 216, the encoding engine 112 transmits the encoded signal.

Figure 4:
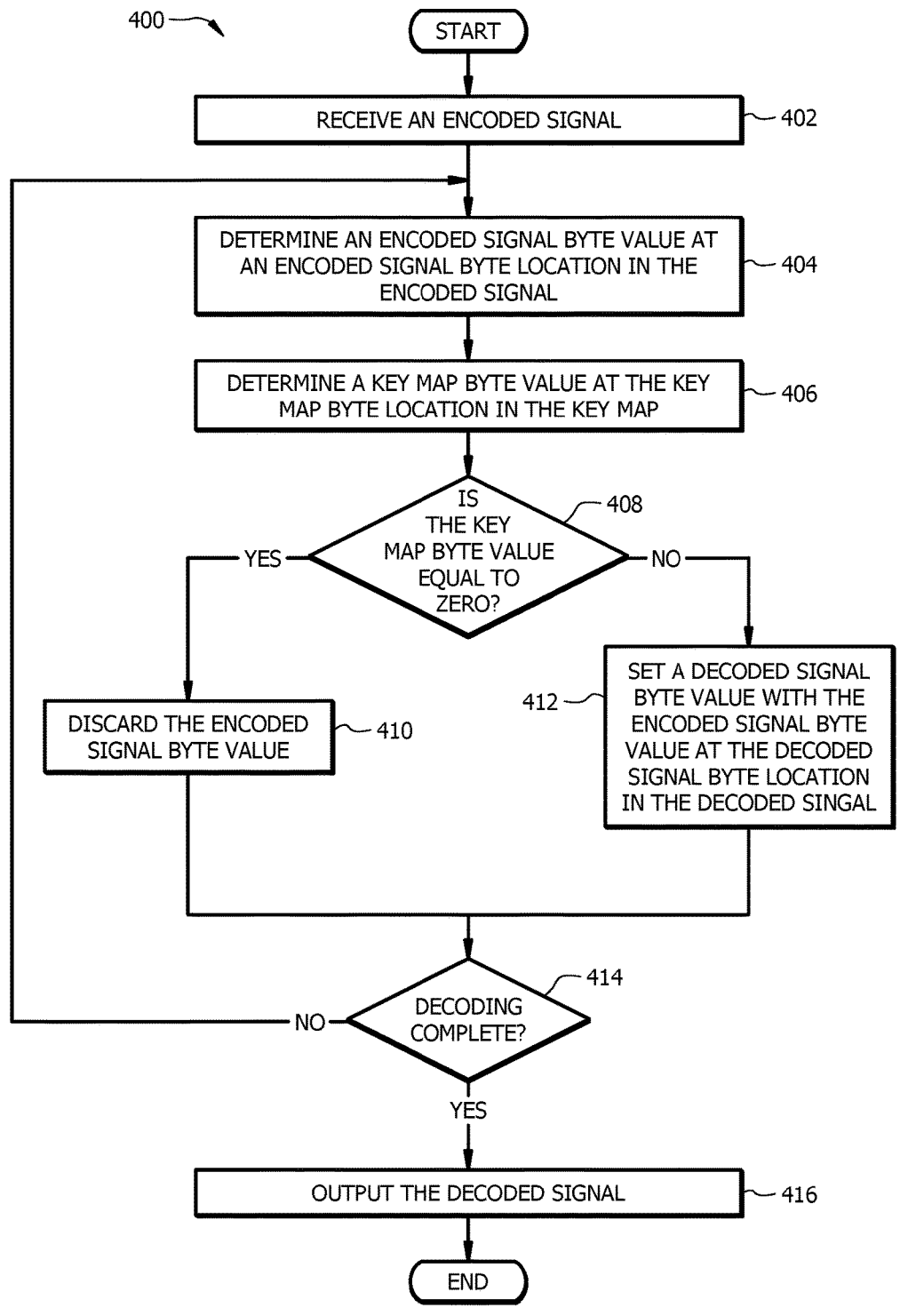
FIG. 4 is a flowchart of an embodiment of an decoding method for the communication system.

FIG. 4 is a flowchart of an embodiment of an decoding method 400 for the communication system 100. Method 400 is implemented by a decoding engine 122 to decode an encoded signal that was communicated across the network. A non-limiting example is provided to illustrate how the decoding engine 122 implements method 400 to decode an encoded signal. In this example, a user receives an encoded signal that encoded by an encoding engine 112. The user employs a device with a decoding engine 122 (e.g. decoding device 104) to decode the encoded signal. The key map may be sent to decoding engine 122 or downloaded by the decoding engine 122 prior to decoding the encoded signal. Other encryption information (e.g. encryption keys or encryption type identifiers) may also be sent to the decoding engine 122. The decoding engine 122 may also decrypt the decoded signal when the original data signal was encrypted by the encoding engine 112. The resulting decoded signal comprises the original data content that was sent to the user.

At step 402, the decoding engine 122 receives an encoded signal. At step 404, the decoding engine 122 determines an encoded signal byte value at an encoded signal byte location in the encoded signal. The byte location in the encoded signal is mapped to a corresponding byte location in a key map. For example, the fourth byte location in the encoded signal may be mapped to the fourth location in the key map. At step 406, the decoding engine 122 determines a key map byte value at the key map byte location in the key map.

An example of performing steps 404 and 406 is shown in FIG. 5. Referring to FIG. 5, an encoded signal 502, a key map 504, and a decoded signal 506 are shown. In FIG. 5, the first seven byte locations 510 of each signal are labeled to indicate their corresponding byte values 512. For example, in the encoded signal 502, the first byte location has a byte value of 0x7d, the second byte location has a byte value of 0x30, the third byte location has a byte value of 0x05, and so on. In this example, the byte values are represented in hexadecimal. In other examples, the byte values may be represented using any other system.

In FIG. 5, the first iteration in the decoding process is shown using arrows. In this example, the first byte location in the encoded signal 502 is the current encoded signal byte location. The first byte location in the encoded signal 502 has a byte value of 0x7d. The first byte location of the encoded signal 502 is mapped to the first byte location in the key map 504. The first byte location in the key map 504 has a byte value of 0x06.

Returning to FIG. 4, at step 408, the decoding engine 122 determines whether the key map byte value is equal to zero. The decoding engine 122 proceeds to step 410 when the decoding engine 122 determines that the key map byte value is equal to zero. Otherwise, the decoding engine 122 proceeds to step 412 when the decoding engine 122 determines that the key map byte value is not equal to zero.

As an example, in FIG. 5, the key map byte value in the first byte location of the key map 504 is 0x06, which is not equal to zero (i.e. 0x00). In this example, the decoding engine 122 would then proceed to step 412. In the key map byte value had been 0x00, then the decoding engine 122 would proceed to step 410.

At step 410, the decoding engine 122 discards the encoded signal byte value. In this example, the key map uses a byte value of 0x00 to indicate that the byte value in the encoded signal is not part of the original data signal. Since the current byte value in the encoded signal is not part of the original data signal, the byte value can be safely ignored or discarded.

Returning to step 408, the decoding engine 122 proceeds to step 412 when the decoding engine 122 determines that the key map byte value is not equal to zero. At step 412, the decoding engine 122 sets a decoded signal byte value with the encoded signal byte value at the decoded signal byte location in the decoded signal.

Referring again to FIG. 5, the current key map byte location is the first key byte location in the key map 504. The key map byte value in the first byte location of the key map 504 is 0x06, which references the sixth byte location in the decoded signal 506. In this iteration, the decoding engine 122 sets the current decoded signal byte value in the sixth decodes signal byte location with the current data signal byte value (i.e. 0x7d).

Returning to FIG. 4, at step 414, the decoding engine 122 determines whether the decoding process is complete. For example, the decoding engine 122 may determine that the decoding process is complete when there are no more byte locations to process in the key map. In other examples, the decoding engine 122 may determine that the decoding process is complete using any other suitable technique. The decoding engine 122 returns to step 404 for additional decoding when the decoding engine 122 determines that the decoding process has not been completed. Otherwise, the decoding engine 122 proceeds to step 416 when the decoding engine 122 determines that the decoding process is complete. The resulting decoded signal is the original data signal that was encoded by the encoding engine 112. The decoded signal is shorter in length than the received encoded signal since the encoded signal comprises both the original data signal and a noise signal.

In one embodiment, the decoding engine 122 decrypts the decoded signal when the original data signal was encrypted by the encoding engine 112. The decoding engine 122 may employ any suitable decrypting algorithm and technique as would be appreciated by one of ordinary skill in the art.

At step 416, the decoding engine 122 outputs the decoded signal. In one embodiment, the decoding engine 122 may output the decoded signal as an audio and/or visual representation on a graphical user interface. For example, the decoded signal may be displayed as an electronic document (e.g. a text file or an image) on a graphical display. As another example, the decoded signal may be played as a video or audio file. In another embodiment, the decoding engine 122 may out the decoded signal by storing the decoded signal in memory (e.g. memory 120). For example, the decoded signal may be stored as a readable electronic document in memory. In another embodiment, the decoding engine 122 may send or forward the decoded signal to one or more other devices. For example, the decoding engine 122 may send the decoded signal to another device for further processing or displaying.

Table 1 is an example of the complexity involved in decoding a data signal that is encrypted and encoded using brute force. The first column shows the encryption algorithm being used, which is a 256 bit key in an AES encryption algorithm. The second column shows the number of possible combinations to decrypt an encrypted signal using brute force. The third column shows different length key maps. The fourth column shows the number of possible combinations to decode an encoded signal using brute force. In this example, key pattern encryption provides a larger number of possible combinations compared to conventional encryption alone. The larger number of possible combinations means that key pattern encryption is more complex and will require more time to decrypt using brute force approaches compared to just using conventional encryption algorithms. The number of possible combinations and complexity increases as the length of the key map increases. The fifth column shows the final complexity (i.e. the number of possible combinations) when combing an AES encryption algorithm with key pattern encryption. Combing the AES encryption algorithm with key pattern encryption further increases the complexity over just using AES encryption or key pattern encryption alone. Thus, using key pattern encryption either by itself or with conventional encryption algorithms increases complexity and overall security of the data compared to conventional encryption techniques.

TABLE 1

| AES Example - Encryption Key Length | Encryption Possible Combinations (x) | Key Map (Noise Overlay) Length | Key Map/Overlay Possible Combinations (y) | (x) * (y) Final Complexity |
|---|---|---|---|---|
| 256 bit | $1.1 \times 10^{77}$ | 256 bytes | $8.5762 * 10^{5006}$ | $9.4360 * 10^{509}$ |
| 256 bit | $1.1 \times 10^{77}$ | 512 bytes | $3.4773 * 10^{1166}$ | $3.8250 * 10^{1243}$ |
| 256 bit | $1.1 \times 10^{77}$ | 1024 bytes | $5.4185 * 10^{2639}$ | $5.9604 * 10^{2716}$ |
| 256 bit | $1.1 \times 10^{77}$ | 2048 bytes | $1.6727 * 10^{2894}$ | $1.84 * 10^{8951}$ |
| 256 bit | $1.1 \times 10^{77}$ | 4096 bytes | $3.6427 * 10^{13019}$ | $4.007 * 10^{18096}$ |

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   an encoder device comprising:
      a first memory operable to store a first key map, wherein:
         each byte of the first key map is mapped to a byte of a noise signal;
         the value of each byte of the first key map identifies a byte location of a data signal; and
      an encoding engine implemented by a first processor operably coupled to the first memory, and configured to:
         obtain the data signal;
         generate the noise signal, wherein the noise signal is at least as long as the data signal;
         generate an encoded signal, wherein generating the encoded signal comprises iteratively for each byte of the first key map:
            determining a key map byte value at a key map byte location in the first key map, wherein the key map byte value indicates a data signal byte location in the data signal;
            determining a data signal byte value at the data signal byte location in the data signal; and
            overwriting a noise signal byte value with the data signal byte value at a noise signal byte location in the noise signal when the key map byte value is not equal to zero, wherein:
               the noise signal byte location corresponds with the key map byte location, and
               the noise signal byte value at the noise signal byte location is unchanged when the key map byte value is equal to zero; and
         transmit the encoded signal to a decoder device; and
   the decoder device comprising:
      a second memory operable to store a second key map, wherein:
         each byte of the second key map is mapped to a byte of the encoded signal; and
         the value of each byte of the second key map identifies a byte location of a decoded signal; and
      a decoder engine implemented by a second processor operably coupled to the second memory, and configured to:
         decode the encoded signal to generate the decoded signal, wherein decoding the encoded signal comprises iteratively for each byte of the encoded signal:
            determining an encoded signal byte value at an encoded signal byte location in the encoded signal, wherein the encoded signal byte location is mapped to a key map byte location in the second key map;

determine a key map byte value at the key map byte location in the second key map, wherein the key map byte value identifies a decoded signal byte location;

discarding the encoded signal byte value when the key map byte value at the key map byte location is equal to zero; and setting a decoded signal byte value with the encoded signal byte value at the decoded signal byte location in the decoded signal when the key map byte value at the key map byte location is not equal to zero; and output the decoded signal.

2. The system of claim 1, wherein each key map byte value in the first key map has a unique value when the key map byte value is not zero.

3. The system of claim 1, wherein the value of each byte of the first key map identifies the byte location of the data signal using offset value.

4. The system of claim 1, wherein the first key map is the same length as the noise signal.

5. The system of claim 1, wherein the encryption engine is configured to generate the first key map, wherein generating the first key map comprises:

generating a key map template, wherein every byte of the first key map is set to zero; and randomly assigning byte locations of the data signal to the key map template to generate the first key map.

6. The system of claim 1, wherein:

the data signal is an encrypted signal, and the decoder engine is configured to decrypt the decoded signal.

7. The system of claim 1, wherein the decoded signal is shorter in length than the encoded signal.

8. The system of claim 1, the first key map and the second key map are identical.

9. A decoding device comprising:

a network interface configured to receive an encoded signal;

a memory operable to store a key map, wherein:

each byte of the key map is mapped to a byte of the encoded signal; and the value of each byte of the key map identifies a byte location of a decoded signal; and a decoder engine implemented by a processor operably coupled to the network interface and the memory, and configured to:

decode the encoded signal to generate the decoded signal, wherein decoding the encoded signal comprises iteratively for each byte of the encoded signal:

determining an encoded signal byte value at an encoded signal byte location in the encoded signal, wherein the encoded signal byte location is mapped to a key map byte location in the key map;

determine a key map byte value at the key map byte location in the key map, wherein the key map byte value identifies a decoded signal byte location;

discarding the encoded signal byte value when the key map byte value at the key map byte location is equal to zero; and setting a decoded signal byte value with the encoded signal byte value at the decoded signal byte location in the decoded signal when the key map byte value at the key map byte location is not equal to zero; and output the decoded signal.

10. The device of claim 9, wherein each key map byte value has a unique value when the key map byte value is not zero.

11. The device of claim 9, wherein the value of each byte of the key map identifies the byte location of the data signal using an offset value.

12. The device of claim 9, wherein the decoder engine is configured to receive the key map.

13. The device of claim 9, wherein the decoded signal is shorter in length than the encoded signal.

14. The device of claim 9, wherein the decoder engine is configured decrypt the decoded signal.

15. A decoding method comprising:

receiving an encoded signal;

decoding the encoded signal to generate a decoded signal, wherein decoding the encoded signal comprises iteratively for each byte of the encoded signal:

determining an encoded signal byte value at an encoded signal byte location in the encoded signal, wherein:

the encoded signal byte location is mapped to a key map byte location in a key map;

each byte of the key map is mapped to a byte of the encoded signal; and the value of each byte of the key map identifies a byte location of the decoded signal;

determining a key map byte value at the key map byte location in the key map, wherein the key map byte value identifies a decoded signal byte location;

discarding the encoded signal byte value when the key map byte value at the key map byte location is equal to zero; and setting a decoded signal byte value with the encoded signal byte value at the decoded signal byte location in the decoded signal when the key map byte value at the key map byte location is not equal to zero; and outputting the decoded signal.

16. The method of claim 15, wherein each key map byte value has a unique value when the key map byte value is not zero.

17. The method of claim 15, wherein the value of each byte of the key map identifies the byte location of the data signal using an offset value.

18. The method of claim 15, further comprising receiving the key map.

19. The method of claim 15, wherein the decoded signal is shorter in length than the encoded signal.

20. The method of claim 15, further comprising decrypting the decoded signal.

* * * * *